United States Patent
Kosal et al.

(10) Patent No.: US 12,098,308 B2
(45) Date of Patent: Sep. 24, 2024

(54) EPOXY PATCH HAVING IMPROVED ADHESION CHARACTERISTICS

(71) Applicant: Zephyros, Inc., Romeo, MI (US)

(72) Inventors: David Kosal, Richmond, MI (US); Keith Madaus, Richmond, MI (US)

(73) Assignee: Zephyros, Inc., Romeo, MI (US)

( * ) Notice: Subject to any disclaimer, the term of this patent is extended or adjusted under 35 U.S.C. 154(b) by 376 days.

(21) Appl. No.: 17/694,317

(22) Filed: Mar. 14, 2022

(65) Prior Publication Data

US 2022/0204811 A1    Jun. 30, 2022

Related U.S. Application Data

(63) Continuation of application No. 16/087,155, filed as application No. PCT/US2017/023808 on Mar. 23, 2017, now Pat. No. 11,274,232.

(60) Provisional application No. 62/312,171, filed on Mar. 23, 2016.

(51) Int. Cl.

| | |
|---|---|
| C09J 7/22 | (2018.01) |
| C08K 5/09 | (2006.01) |
| C08K 11/00 | (2006.01) |
| C08L 63/00 | (2006.01) |
| C09J 7/20 | (2018.01) |
| C09J 11/06 | (2006.01) |
| C09J 11/08 | (2006.01) |
| C09J 163/00 | (2006.01) |

(52) U.S. Cl.
CPC ............... *C09J 7/22* (2018.01); *C08K 5/09* (2013.01); *C08K 11/00* (2013.01); *C08L 63/00* (2013.01); *C09J 7/20* (2018.01); *C09J 11/06* (2013.01); *C09J 11/08* (2013.01); *C09J 163/00* (2013.01); *C08L 2207/53* (2013.01); *C09J 2301/412* (2020.08); *C09J 2463/00* (2013.01)

(58) Field of Classification Search
CPC ....... C09J 7/22; C09J 7/20; C09J 11/06; C09J 11/08; C09J 163/00; C09J 2301/412; C09J 2463/00; C09J 2203/354; C09J 2400/166; C09J 2400/263; C08K 5/09; C08K 11/00; C08L 63/00; C08L 2207/53
See application file for complete search history.

(56) References Cited

U.S. PATENT DOCUMENTS

| | | | |
|---|---|---|---|
| 2002/0009582 A1* | 1/2002 | Golden | ............ C09J 7/35 428/297.4 |
| 2004/0266899 A1 | 12/2004 | Muenz et al. | |
| 2008/0188609 A1* | 8/2008 | Agarwal | ............ C08L 63/00 524/500 |
| 2011/0126981 A1 | 6/2011 | Lutz | |
| 2014/0113983 A1 | 4/2014 | Czaplicki | |
| 2014/0134905 A1* | 5/2014 | Quaderer | ............ B29C 44/1266 442/1 |
| 2015/0000839 A1 | 1/2015 | Czaplicki | |

FOREIGN PATENT DOCUMENTS

| | | |
|---|---|---|
| CN | 1433453 A | 7/2003 |
| CN | 101287794 A | 10/2008 |
| CN | 102260466 A | 11/2011 |
| CN | 103459539 A | 12/2013 |
| EP | 1456286 A1 | 9/2004 |
| EP | 1920005 A1 | 5/2008 |
| WO | 03/054069 A1 | 7/2003 |
| WO | 2007/025007 A1 | 3/2007 |

OTHER PUBLICATIONS

PCT Search Report & Written Opinion dated Jun. 16, 2017, Application No. PCT/US2017/023808.
Chinese Second Office Action dated Mar. 29, 2021, Application No. 201780016910.0.
Chinese First Office Action dated Jul. 27, 2020, Application No. 201780016910.0.
Chinese Search Report Dated Jul. 8, 2020, Application No. 201780016910.0.
India First Examination Report dated Sep. 18, 2020, Application No. 201837032596.
European Second Communication dated Aug. 26, 2020, Application No. 17719045.5.

* cited by examiner

*Primary Examiner* — Daniel H Lee
(74) *Attorney, Agent, or Firm* — The Dobrusin Law Firm, PC

(57) ABSTRACT

A device comprising an adhesive material and a fiberglass mesh located in direct planar contact with the adhesive material. The adhesive material is tacky in its green state and includes an epoxy, an epoxidized cashew nut shell oil, and at least about 20% by weight of a component containing a core shell polymer material to improve the adhesion capability to surfaces that are contaminated and/or exposed to high pressure spraying or chemical treatments, heat and humidity.

20 Claims, No Drawings

EPOXY PATCH HAVING IMPROVED ADHESION CHARACTERISTICS

TECHNICAL FIELD

The present teachings relate generally to a reinforcement member that includes an activatable material having an improved ability to adhere to locations that undergo coating treatments and/or are otherwise contaminated.

BACKGROUND

Due to ongoing challenges with fuel economy requirements, the gauge of metal used in the automotive industry has reduced dramatically over the past 5 years. Specifically the gauge of metal used to make doors, sliding doors, tailgates and truck bed sides has decreased from about 1.2 mm to about 0.7 mm over the past 5 years. A class of materials known as panel stiffeners (e.g., reinforcing patches) has been used to help stiffen these areas of the vehicle. Most of the time these materials are made of a pressure sensitive adhesive with a constraining layer on top. The adhesive can be any thermosetting adhesive that provides good green state adhesion and good cured properties such as modulus. Epoxy based adhesives are often utilized due to their great adhesion to metal and high modulus. The constraining layer can be metal, glass or thermoplastic sheets to name a few. However, glass weaves tend to give the highest modulus for the panel stiffener. Pressure sensitive adhesives with foaming capabilities are particular desirable given that the cured thickness increases the moment of inertia and ultimately decreases deflection of the panel.

However, the currently available solutions lack the desired combinations of properties needed to meet all of the needs. One particular draw back of the current panel stiffeners is the fact that their rheological behavior is such that they will delaminate from the panel upon exposure to excessive contamination (e.g., stamping lubricants and the like), chemical baths high pressure rinses in between baths during vehicle manufacture. These panel stiffeners not only wash off of the metal substrate (eliminating the reinforcement), but also contaminate the chemical baths.

There is thus a need for a wash-off resistant panel stiffener. The challenge is that the chemical baths are typically heated to around 150° F. This elevated temperature is well above the glass transition temperature of the uncured adhesive causing the adhesive to soften and more easily wash off the substrate. When one changes the material characteristic in such a way as to increase the glass transition temperature of the adhesive to prevent wash-off, the green state adhesion (e.g., adhesion prior to any expansion/activation/curing of the adhesive) can be reduced. In addition to wash-off difficulty and excessive stamping lubricant, the need to adhere to aluminum substrates is very important. Further, exposure to extreme high pressure from sprays during the manufacture process are create additional need for improved adherence.

There is a thus further need for such reinforcing materials that sufficiently adhere to cavity walls, especially when the walls are contaminated with various oils and other lubricants utilized during vehicle manufacture. Sufficient adhesion is also an issue when cavity walls are exposed to coating treatments, high pressure spray treatments, chemical baths, or high heat and high humidity, such as that which occurs during electro coating and paint bake operations.

SUMMARY OF THE INVENTION

The teachings herein contemplate a patch comprising: an activatable adhesive material comprising an epoxy, a core shell polymer dispersed in liquid epoxy, a thermoplastic phenoxy, and an epoxidized cashew nut shell oil; and a fiberglass mesh located in direct planar contact with the adhesive material and along at least a portion of the adhesive material.

The adhesive material may be tacky prior to activation allowing the adhesive material to adhere to the fiberglass mesh and to a surface for reinforcing the surface. The adhesive may include from about 20% to about 45% by weight core shell polymer dispersed in epoxy. The adhesive may include from about 3% to about 15% by weight epoxidized cashew nut shell oil. The adhesive may include at least about 20% by weight core shell polymer dispersed in epoxy. The adhesive may include at least about 30% by weight core shell polymer dispersed in epoxy. The adhesive may include at least about 35% by weight core shell polymer dispersed in epoxy. The core shell polymer may be dissolved in a material that is liquid at ambient temperature. The patch may be substantially free of any magnetic materials. The patch may have a green state prior to activation and the patch in its green state remains adhered to a metallic surface during exposure to any chemical bath and any high pressure spray process.

The teachings herein further provide for use of the patch of any of the preceding claims for adhering to a surface coated with stamping lubricant.

The teachings herein also envision a device and method for the structural reinforcement of body stampings with an expandable structural adhesive material and associated mesh. The device disclosed herein may allow for effective reinforcing of a cavity where no additional fastening steps or fastening means are required. The device may also adhere without wash-off during chemical coating treatments, high pressure spray treatments, exposure to heat and humidity and contact with oils, lubricants and other contaminants. It is possible that one or polymers within the adhesive included on the patch is capable of absorbing oil from a substrate surface so that adhesion is maintained.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/312,171, filed Mar. 23, 2016, the contents of that application being hereby incorporated by reference herein for all purposes.

The adhesive material of the present teachings is formulated to adhere in its green state (e.g., prior to activation) despite the presence of a number of factors that challenge sufficient adhesion. Included among these factors is contact with high heat and humidity conditions in a manufacturing plant and in a paint bake oven. In addition, the surfaces of vehicle cavities are typically coated with a number of lubricants presenting significant challenges to adhesion of reinforcing structures with no additional fastening means. Lastly, most vehicles are subjected to a variety of cleaning agents, phosphate baths and high pressure spraying/washing steps which also have a tendency to prevent sufficient adhesion between a cavity wall and a reinforcing patch. Furthermore, upon expansion of the adhesive described herein, the combination of filler, phenoxy and core shell components assist in reducing sag of the adhesive which also improves the overall adhesion. The adhesive patches described herein are particularly well suited for adhesion in the green state to a variety of materials, including dissimilar metals such as steel and aluminum commonly utilized in vehicle manufacture. The adhesive described herein also has improved high and low temperature characteristics. For example, prior to application to a panel surface, the adhesive may include a release paper that is removed prior to application. In high temperatures and humidity, many similar adhesives will stick to the release paper. However, the adhesives described herein avoid adhesive failure at both high and low temperatures (e.g., temperatures in the range of about 60° F. to about 130° F.).

The adhesive material of the present teachings is at least partially tacky at room temperature (e.g., about 23° C.) and is also preferably tacky at temperatures between about 0° C. and about 80° C. U.S. Patent Publication No. 2014/0134905 discloses certain reinforcing structures that may be utilized in combination with the adhesive formulation described herein.

Additionally, the adhesive material preferably exhibits reinforcement characteristics (e.g., imparts rigidity, stiffness, strength or a combination thereof to a member). It is also preferable for the adhesive material to be heat activated to expand or otherwise activate and wet surfaces which the adhesive material contacts. After expansion or activation, the adhesive material preferably cures, hardens and adheres to the surfaces that it contacts. For application purposes (e.g., when the adhesive is in its green state), it is often preferable that the adhesive material exhibit flexibility, particularly when the adhesive material is to be applied to a contoured surface of a vehicle body. Once applied, however, it is typically preferable for the adhesive material to be activatable to soften, expand (e.g., foam), cure, harden or a combination thereof. For example, and without limitation, a typical adhesive material will include a polymeric material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the adhesive material may be initially processed as a flowable material before curing. Thereafter, the base material preferably cross-links upon curing, which makes the material substantially incapable of further flow.

The epoxy may be aliphatic, cycloaliphatic, aromatic or the like. The epoxy may be supplied as a solid (e.g., as pellets, chunks, pieces or the like) or a liquid. The epoxy may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. One exemplary epoxy resin may be a phenolic resin, which may be a novalac type or other type resin. Other preferred epoxy containing materials may include a bisphenol-A epichlorohydrin ether polymer, or a bisphenol-A epoxy resin which may be modified with butadiene or another polymeric additive. Examples of suitable epoxy-based materials, which may be used as in the base material are sold under the product designations L5020, L5010, L5224, L8000, L5001 and are commercially available from L&L Products, Romeo, Mich. According to preferred formulations, the base material can include up to about 50% by weight epoxy resins (e.g., any component which includes an epoxy resin component), more preferably, up to about 65% by weight epoxy resins, and even more preferably up to about 80% by weight epoxy resins.

The adhesive includes at least one core shell polymer, which may be a core shell polymeric material dissolved in an epoxy-based material. As used herein, the term core/shell polymer denotes a material wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems.

The first and second polymeric materials of the core shell polymer can include elastomers, polymers, thermoplastics, copolymers, other components, combinations thereof or the like. In preferred embodiments, the first polymeric material, the second polymeric material or both of the core shell polymer include or are substantially entirely composed of (e.g., at least 70%, 80%, 90% or more by weight) one or more thermoplastics. Exemplary thermoplastics include, without limitation, styrenics, acrylonitriles, acrylates, acetates, polyamides, polyethylenes or the like. It is possible that the core shell material described herein may be formed by an emulsion polymerization process whereby a liquid epoxy resin is utilized as the base for the emulsion. Accordingly, the core shell material may be substantially free of contaminants that generally form during an emulsion polymerization process that occurs without the use of epoxy as the emulsion base. Furthermore, as a result of this process, corrosion about the adhesive may be reduced.

Preferred core shell polymers are formed by emulsion polymerization followed by coagulation or spray drying. It is also preferred for the impact modifier to be formed of or at least include a core-shell graft co-polymer. The first or core polymeric material of the graft copolymer preferably has a glass transition temperature substantially below (i.e., at least 10, 20, 40 or more degrees centigrade) the glass transition temperature of the second or shell polymeric material. Moreover, it may be desirable for the glass transition temperature of the first or core polymeric material to be below 23° C. while the glass temperature of the second or shell polymeric material to be above 23° C., although not required.

Examples of useful core shell graft copolymers are those where hard containing compounds, such as styrene, acrylonitrile or methyl methacrylate, are grafted onto core made from polymers of soft or elastomeric containing compounds such as butadiene or butyl acrylate. U.S. Pat. No. 3,985,703, which is herein incorporated by reference, describes useful core-shell polymers, the cores of which are made from butyl acrylate but can be based on ethyl isobutyl, 2-ethylhexel or other alkyl acrylates or mixtures thereof. The core polymer, may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl methacrylate and optionally other alkyl methacrylates, such as ethyl, butyl, or mixtures thereof methacrylates. Up to 40 percent by weight or more of the shell monomers may be styrene, vinyl acetate, vinyl chloride, and the like. Additional core-shell graft copolymers useful in embodiments of the present teachings are described in U.S. Pat. Nos. 3,984,497; 4,096,202; 4,034,013; 3,944,631; 4,306,040; 4,495,324; 4,304,709; and 4,536,436, the entireties of which are herein incorporated by reference. Examples of core shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

An epoxidized cashew nut shell liquid may be utilized in an effort to impart ductility to the adhesive in its green state and also to improve adhesion to contaminated substrates. The cashew nut shell liquid is formed by the epoxidation of cashew nut shell liquid with organic compounds containing a three-membered oxide ring known as epoxy, oxirane, or ethoxyline group. Cashew nut shell liquid (CNSL) is a natural, non-food chain, annually renewable biomaterial. The cashew nut shell liquid contains mainly anacardic acid and a smaller amount of cardol and its methyl derivatives. CNSL can be decarboxylated and distilled to yield high purity cardanol, a highly desirable alkylphenolic compound. Cardanol is a naturally occurring metasubstituted alkenyl phenol similar to nonylphenol. Cardanol is hydrophobic in nature due to the presence of a hydrocarbon chain and remains flexible and liquid at very low temperatures. Thus, if the adhesive as described herein is submerged in water for significant amounts of time, the Cardanol may assist in avoiding saturation of the adhesive with water. Cardanol is a natural alkylphenolic material with an aromatic ring that provides a strong chemical resistant backbone while the hydroxyl group gives strong adhesion and good reactivity for fast and low temperature cure. A long aliphatic side chain provides excellent water resistance, good flexibility, low viscosity, extended pot life, and excellent corrosion protection. Compounds which can be used for the epoxidation reaction are ethylene oxide or substantial ethylene oxides such as propylene oxide, phenyl glycidyl ether, glycidyl chloride (epichlorohydrin), vinyl-cyclohex-3-ene dioxide, the like, or a combination thereof. Epichlorohydrin is preferred due to ease of processability and high availability. Epichlorohydrin is reacted in an excess of about 10 molar times the amount of cashew nut shell liquid. The reaction is carried out in an alkaline medium, and the excess epichlorohydrin can be distilled off after the reaction. The epoxidized cashew nut shell liquid has an equivalent weight of around 250 to 450 g/equivalent, or one reactive epoxide group per 250-450 g of the epoxidized cashew nut shell liquid. CNSL can be used as a resin modifier, as a phenolic compound shown above, or it can be epoxidized through the phenolic group to make an epoxy resin to be used in an epoxy mixture. Epoxidized cashew nut shell liquid is preferably included in the adhesive in an amount between about 5 and 25% by weight of the total composition, more preferably about 7% to about 10%. The preferred CNSL used in these teachings is Cardolite LITE 2513HP manufactured by Cardolite Corporation (Newark, NJ).

It is possible that the adhesive described herein includes a thermoplastic component. This component may comprise a phenoxy material. The phenoxy resin may be a high molecular weight thermoplastic condensation products of bisphenol A and epichloro-hydrin and their derivatives. Modified phenoxy resins may also be used. Examples of phenoxy resins that may be used are the products marketed by Inchem Corp. Examples of suitable materials are the PKHB, PKHC, PKHH, PKHJ, PKHP pellets and powder. Alternatively phenoxy/polyester hybrids and epoxy/phenoxy hybrids may be used. In order to enhance the production of the adhesive described herein, the phenoxy resin may be supplied to the other components as a solution. While any solvent may be used, it is particularly preferred to use a liquid epoxy resin as the solvent as this can also contribute to the adhesive properties upon activation. The phenoxy material may be present in the adhesive in an amount between about 1% and 25% by weight of the total composition. The phenoxy material may be present in the adhesive in an amount between about 5% and 15% by weight of the total composition.

As general guidance for the expandable adhesive material, it is preferable that at least 1% by weight of the components have a low enough molecular weight to be a liquid at about 23° C. More preferably, at least 5% by weight of the components have a low enough molecular weight to be a liquid at about 23° C. Still more preferably, at least 10% by weight of the components have a low enough molecular weight to be a liquid at about 23° C.

One or more blowing agents may be added to the activatable material for producing inert gasses that form, as desired, an open and/or closed cellular structure within the activatable material. The blowing agent may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4i-oxy-bis-(benzenesulphonylhydrazide), trihydrazinotriazine and N, Ni-dimethyl-N,Ni-dinitrosoterephthalamide.

An accelerator for the blowing agents may also be provided in the activatable material. Various accelerators may be used to increase the rate at which the blowing agents form inert gasses. One preferred blowing agent accelerator is a metal salt, or is an oxide, e.g. a metal oxide, such as zinc oxide. Other preferred accelerators include modified and unmodified thiazoles or imidazoles.

Amounts of blowing agents and blowing agent accelerators can vary widely within the activatable material depending upon the type of cellular structure desired, the desired amount of expansion of the activatable material, the desired rate of expansion and the like. Exemplary ranges for the amounts of blowing agents and blowing agent accelerators in the activatable material range from about 0.001% by weight to about 5% by weight and are preferably in the activatable material in fractions of weight percentages.

One or more curing agents and/or curing agent accelerators may be added to the activatable material. Amounts of curing agents and curing agent accelerators can, like the blowing agents, vary widely within the activatable material depending upon the type of cellular structure desired, the desired amount of expansion of the activatable material, the desired rate of expansion, the desired structural properties of the activatable material and the like. Exemplary ranges for the curing agents or curing agent accelerators present in the activatable material range from about 0.001% by weight to about 7% by weight.

Preferably, the curing agents assist the activatable material in curing by crosslinking of the polymers, epoxy resins or both. It is also preferable for the curing agents to assist in thermosetting the activatable material. Useful classes of curing agents are materials selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), or mixtures thereof. Particular preferred curing agents include modified and unmodified polyamines or polyamides such as triethylenetetramine, diethylenetriamine tetraethylenepentamine, cyanoguanidine, dicyandiamides and the like. An accelerator for the curing agents (e.g., a modified or unmodified urea such as methylene diphenyl bis urea, an imidazole or a combination thereof) may also be provided for preparing the activatable material.

The activatable material may also include one or more fillers, including but not limited to particulated materials (e.g., powder), beads, microspheres, or the like. Preferably the filler includes a material that is generally non-reactive with the other components present in the activatable material. While the fillers may generally be present within the activatable material to take up space at a relatively low weight, it is contemplated that the fillers may also impart properties such as strength and impact resistance to the activatable material.

Examples of fillers include silica, diatomaceous earth, glass, clay (e.g., including nanoclay), talc, pigments, colorants, glass beads or bubbles, glass, carbon or ceramic fibers, nylon or polyamide or aramid fibers (e.g., Kevlar), antioxidants, and the like. Such fillers, particularly clays, can assist the activatable material in leveling itself during flow of the material. Furthermore, certain fibrous fillers such as Kevlar may assist in reducing sag of the adhesive post activation. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica or wollastonite may be used as fillers.

When employed, the fillers in the activatable material can range from 10% or less to 90% or greater by weight of the activatable material, but more typical from about 30 to 55% by weight of the activatable material. According to some embodiments, the activatable material may include from about 0% to about 3% by weight, and more preferably slightly less than 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

A non-limiting example in accordance with the teachings herein is set forth below at Table 1.

TABLE 1

| Material | Amount (wt. %) |
|---|---|
| Reaction product of CTBN and solid epoxy (solid) | 12.00 |
| Phenoxy dissolved in Bisphenol F (solid) | 9.50 |
| Solid epoxy/aramid fiber (solid) | 9.25 |
| Core shell polymer in liquid epoxy (liquid) | 36.00 |
| Phenol novolac epoxy | 3.75 |
| Epoxidized cashew nut shell oil | 8.00 |
| Wollastonite | 5.27 |
| $CaCO_3$ | 9.49 |
| Blowing agent | 1.75 |
| Curing agent | 4.10 |
| Curing agent accelerator | 0.77 |
| Pigment | 0.12 |
| | 100% |

In most applications, it is undesirable for the adhesive material to be reactive at room temperature or otherwise at the ambient temperature in a manufacturing environment (e.g. up to about 40° C. or higher). More typically, the adhesive material becomes reactive at higher processing temperatures, such as those encountered in an automobile assembly plant. In such and embodiment, the adhesive material may be foamed upon automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the base material to cause expansion at different temperatures outside the above ranges. Generally, suitable adhesive materials or foams for the adhesive material have a range of expansion ranging from approximately 0 to over 1000 percent.

Advantageously, the adhesive material of the present teachings may be formed or otherwise processed in a variety of ways. For example, preferred adhesive materials can be processed by injection molding, extrusion, compression molding or with a robotically controlled extruder such as a mini-applicator. This enables the formation and creation of part designs that exceed the capability of most prior art materials.

It is contemplated that the base material may be formed of a variety of materials. For example, and without limitation, the base material may be formed primarily of plastics, thermoplastics, epoxy materials, elastomers and the like or combination thereof.

The mesh material located onto the adhesive material may include non-conductive threads or wire (e.g., elongated filament, fibrous, or fabric material), which may be applied as a mat, a cloth, a roving, a netting, a mesh, a scrim, or the like. In such embodiments, the strengthening material may be composed, for example, of woven or unwoven fibers, filaments or the like of cotton, glass (e.g., E-glass or S-glass), fiberglass, Mylar, nylon, polyester, carbon, aramid, plastics, polymers (e.g., thermoplastics such as polyamides (e.g., nylon), PET (e.g., Mylar), polycarbonate, polyethylene, polypropylene, polybutylene (e.g., polybutylene terephthalate), polystyrene, polyurethane, vinyl, or any combination thereof, or other materials. As used herein, "threads," or "wire" connotes a single filament of material, a braided bundle of filaments, or an unbraided bundle of filaments.

In other applications, it may appreciable that the mesh material may be bead-like particles, aggregates, hollow material (e.g., hollow particle), or otherwise, or any combination thereof. In such embodiments, the strengthening material may be composed, for example, of particles or the like of glass (e.g., E-glass or S-glass), fiberglass, nylon, polyester, carbon, aramid, plastics, polymers (e.g., thermoplastics such as polyamides (e.g., nylon), polycarbonate, polyethylene, polypropylene, polybutylene (e.g., polybutylene terephthalate), polystyrene, polyurethane, vinyl, or any combination thereof), or other materials.

Adhesive Wash-Off Testing

A galvanized and/or electro-coated substrate is washed with isopropyl alcohol. A first section of the substrate remains clean and a second section of the substrate is covered in oil. Approximately 36 generous sized drops of Quaker 61AUS oil are applied per square foot of metal. The oil is pipetted onto the substrate and distributed as uniformly as possible with a brush or hand application. The oil is applied so that the substrate has a wet appearance but not dripping.

After the oil is applied, the substrates sit horizontally for 1 hour to normalize and level off. Patches containing the adhesive in accordance with the present teachings having a size of approximately 2 to 3 inches wide by 4 to 6 inches in length are applied to each section of substrate (oiled and non-oiled) using a roller (5 pound mass) to remove any trapped air and seal the edges. The patches are then set horizontally for 2 hours at room temperature. After setting, one patch can be removed and cohesive or adhesive failure is recorded (cohesive is desired).

The panel is then held the panel at approximately a 45 degree angle under a faucet with a laminar stream of hot water (between 120° F. and 140° F.) hitting approximately 1 inch above the edge of the patch to be tested. As the water hits the edge of the patch it will try to lift on the patch and cause it to peel.

Existing adhesives (e.g., those not containing the components in the amounts described herein) will demonstrate adhesive failure on the oil covered substrate. However, adhesives in accordance with the teachings herein will remain in adhesive engagement with the oil covered section. Both adhesives remain in adhesive engagement with the clean substrate.

High Heat Adhesion to Release Liner Testing

Strips of adhesives in accordance with the teachings herein with a release liner are clamped in fixture. The release liner is then pulled away from adhesive at a rate of 20 mm/min. The load is relatively consistent up to temperature of 135° F. However, residual adhesive left on release paper at 135° F., demonstrating the ability to apply to a vehicle substrate at temperatures of up to nearly 135° F. (e.g., at least about 120° F.). Results are demonstrated in Table 1 below, each value shown measuring Peel Load (N).

TABLE 1

|  | 60° F. | 75° F. | 90° F. | 105° F. | 120° F. | 135° F. |
| --- | --- | --- | --- | --- | --- | --- |
| 1 | 10.19 | 15.90 | 15.90 | 29.92 | 33.27 | 351.26 |
| 2 | 9.11 | 13.16 | 13.16 | 38.22 | 33.90 | 317.03 |
| 3 | 6.91 | 14.72 | 14.72 | 34.24 | 37.01 | 300.43 |
| 4 |  |  |  |  |  | 290.67 |
| avg | 8.74 | 14.59 | 14.59 | 34.13 | 34.73 | 314.85 |
| std dev | 1.67 | 1.37 | 1.37 | 4.15 | 2.00 | 26.60 |

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A patch comprising:
    an activatable adhesive material comprising:
    (a) a solid epoxy;
    (b) a core shell polymer-containing component;
    (c) an epoxidized cashew nut shell oil;
    (d) a bisphenol A epoxy resin;
    (d) a phenoxy resin component; and
    (e) a blowing agent;
    wherein the patch is sufficiently flexible and tacky that it can be located in its green state onto a contoured substrate with no additional fastening means and adhere to that substrate during exposure to elevated temperatures during chemical baths without wash-off.

2. The patch of claim 1, wherein the adhesive material includes from about 20% to about 45% by weight of the core shell polymer-containing component.

3. The patch of claim 2, wherein the adhesive material includes from about 3% to about 15% by weight of the epoxidized cashew nut shell oil.

4. The patch of claim 2, wherein the adhesive includes a silicate material.

5. The patch of claim 1, wherein the adhesive material includes at least about 20% by weight of a component including a core shell polymer.

6. The patch of claim 1, wherein the adhesive material includes at least about 30% by weight of a component including a core shell polymer.

7. The patch of claim 6, wherein the core shell polymer is dispersed in a material that is in liquid form at ambient temperature.

8. The patch of claim 6, wherein the adhesive includes from about 5% to about 15% of a phenoxy resin.

9. The patch of claim 8, wherein the adhesive includes a calcium-based component.

10. The patch of claim 8, including a fiberglass mesh layer.

11. The patch of claim 6, including a layer selected from a mat, a cloth, a roving, a netting, a mesh, a scrim, or some combination thereof.

12. The patch of claim 1, wherein the patch is substantially free of any magnetic materials.

13. The patch of claim 1, wherein the core shell polymer containing component includes a liquid epoxy resin in which a core shell material is dispersed.

14. The patch of claim 13, wherein the core shell polymer containing component is formed by emulsion polymerization utilizing a liquid epoxy resin as the emulsion base.

15. The patch of claim 1, wherein the patch includes a release liner on a surface.

16. The patch of claim 15, wherein the release liner is removed from the patch without removing any adhesive at a temperatures up to at least about 120° F.

17. The patch of claim 15, wherein the release liner is removed from the patch without removing any adhesive at temperatures between 60° F. and 120° F.

18. The patch of claim 1, wherein the adhesive absorbs oil from an oily substrate surface.

19. The patch of claim 1, wherein the patch resists adhesive failure to oily substrates in its green state.

20. The patch of claim 1, including a strengthening material selected from glass, fiberglass, nylon, polyester, carbon, aramid, plastics, polyamide, polycarbonate, polyethylene, polypropylene, polybutylene, polystyrene, polyurethane, vinyl, or any combination thereof.

* * * * *